United States Patent

Brauner

[11] Patent Number: 6,144,672
[45] Date of Patent: Nov. 7, 2000

[54] DATA SWITCHING SYSTEM

[75] Inventor: Vladimir Brauner, Saint-Alban, France

[73] Assignee: Datamedia, Labege Cedex, France

[21] Appl. No.: 08/996,591

[22] Filed: Dec. 22, 1997

[30] Foreign Application Priority Data

Dec. 22, 1997 [FR] France ................................. 97 16242

[51] Int. Cl.[7] .................................................. H04L 12/28
[52] U.S. Cl. .......................... 370/409; 370/254; 709/220; 714/3
[58] Field of Search .................... 709/223, 224, 709/219, 221, 203, 202, 220; 379/220, 221; 370/352, 422, 255, 389, 409, 399, 395; 714/3

[56] References Cited

U.S. PATENT DOCUMENTS

| | | | |
|---|---|---|---|
| 4,713,806 | 12/1987 | Oberlander et al. . | |
| 4,912,701 | 3/1990 | Nicholas | 370/60 |
| 5,384,771 | 1/1995 | Isdoro et al. | 370/58.2 |
| 5,598,566 | 1/1997 | Pascucci et al. | 395/750 |
| 5,727,157 | 3/1998 | Orr et al. | 395/200.54 |
| 5,768,520 | 6/1998 | Dan et al. | 395/200.53 |

FOREIGN PATENT DOCUMENTS 0 737 920  10/1996  European Pat. Off. .

OTHER PUBLICATIONS

A. Patel et al., "Introduction to names, address and routes in an OSI environment", pp. 27–36, Computer Communications, vol. 13, No. 1, Jan./Feb. 1990.

A. Patel et al., "Introduction to names, addresses and routes in an OSI environment", pp. 27–36, Computer Communications, vol. 13, No. 1, Jan./Feb. 1990.

J.O. Coplien et al., "C++: Evolving Toward A More Powerful Language", pp. 19.32, AT&T Technical Journal, vol. 67, No. 4, Jul./Aug. 1988.

Primary Examiner—Alpus H. Hsu
Assistant Examiner—Duc Ho
Attorney, Agent, or Firm—Young & Thompson

[57] ABSTRACT

A system for switching data between the terminals of a communication network includes a memory and management device storing a model of the network and performing management of this model, the model being constituted by a set of objects which are representative of the elements of the network at a given moment and which have properties defining the characteristics of these elements at that moment, a device manipulating the objects adapted to create new objects, modify existing objects, or delete existing objects from the model, and an interface between the memory and management device and the hardware elements of the network.

15 Claims, 6 Drawing Sheets

DATA SWITCHING SYSTEM

BACKGROUND OF THE INVENTION

The present invention concerns a data switching system.

DESCRIPTION OF THE RELATED ART

Systems of this type known at present, for example autoswitching devices in the field of telephony, are essentially hard-wired electronic devices. In view of their considerable complexity, they are quite inconvenient. Moreover, they have very little flexibility. In particular, they are generally dedicated to a single application.

Thus, there is a need for data switching systems which are readily adaptable to different applications, while having a reasonable cost.

The present invention seeks to provide such a system, which in many cases can be based on a simple microcomputer.

SUMMARY OF THE INVENTION

To this end, the invention has as an object a system for switching data between terminals of a communication network, characterized by the fact that it comprises:

memory and management means for storing a model of the said network and effecting management of this model, the said model being constituted by a set of objects which are representative of the components of the network at a given moment and which possess properties defining the characteristics of these elements at that moment, means for manipulating the objects so as to generate new objects, modify existing objects, or remove existing objects from the model, and an interface between the memory and management means and the hardware components of the network.

The invention therefore has as an essential characteristic to provide a model composed of objects representing hardware components of the network, with a minimum of means for acting upon these objects, namely commands for generating, modifying and eliminating an object.

It is thus possible to use software means for achieving the memory and management means. The means for manipulating objects may themselves be integrated with these software means so as to respond to hardware requests issued from terminals of the network.

It will also be noted that the system according to the invention may be applied to fields other than telephony. The following examples will be given with reference to that field, but the invention may notably also be applied to management of a printer network, video conferencing or interactive television.

In a particular embodiment of the invention, the model is constituted of a class of logical addressing objects notably comprising address-type objects, and a class of physical addressing objects, the classes being connected by the said address-type objects which each possess among their properties a logical address and a physical address.

More particularly, the class of logical addressing objects may comprise the addresses forming nodes of a logical addressing graph, connections forming transitions directed between a source logic address and a target logic address of the logical addressing graph, connections constituted by a linear assembly of connected links, and calls constituted by the association of several connections.

It will be seen hereunder that an address may have as a property apart from its logical and physical addresses, a capacity defining the number of connections which can be referenced thereto.

Furthermore, a link may have as a property, apart from references to its source address and its target address, a capacity defining the number of connections which can pass therethrough.

Similarly, in a particular embodiment, a connection possesses as a property a state characteristic of its development. It furthermore possesses as a property a reference to the call with which it is associated.

More particularly, a connection may exist during logical routing, during physical routing, while awaiting establishment, the logical and physical routings being terminated, or in the process of disconnection. The state property defines this characteristic.

Finally, a call may have as a property a list of connections associated therewith.

As regards the class of physical addressing objects, it may comprise peripherals, objects capable of managing a certain number of channels, these channels, adapted to describe a physical communication and each associated with a peripheral, and multiplexes, defining the capacity of a channel to be associated with zero, one or several connections.

In a particular embodiment, the class of physical addressing objects may moreover comprise outgoing routes, arranged to associate a set of physical addresses with an ordered set of peripherals.

The physical address associated with an outgoing route is calculated, for a connection, as a function of its addressing path in the logical addressing graph.

In a particular embodiment, a peripheral has as a property a capacity defining the maximum number of channels that it is able to manage. By way of example, this number is one for a non-multiplexed telephone line.

Also in a particular embodiment, a channel has as properties a local address and a remote address defining the two addresses for the extremes of physical communication that it describes. It also comprises a list of connections passing therethrough. It will be seen that only one of these connections may be active at a given time.

According to the invention, a process for managing an outgoing call, when communication is to be established with a given physical address, comprises the steps consisting of:

selecting an outgoing route as a function of the said given physical address;

choosing a peripheral among the set defined by the selected outgoing route;

locating a multiplex associated with the said given physical address;

specifying on the basis of this multiplex how many connections may be established on the same channel; and allotting the call to a previously-established channel if the located multiplex has a capacity greater than 0, and if a channel is already created toward the said given physical address, for one of the peripherals of the selected outgoing route; or creating a new channel in the contrary case.

An incoming call is managed in the same manner, except for the steps of selecting an outgoing route and determining an associated peripheral.

BRIEF DESCRIPTION OF THE DRAWINGS

There will now be described, by way of non-limiting example, a particular embodiment of the invention, with reference to the accompanying schematic drawings in which.

DESCRIPTION OF THE PREFERRED EMBODIMENTS

Figure 1:
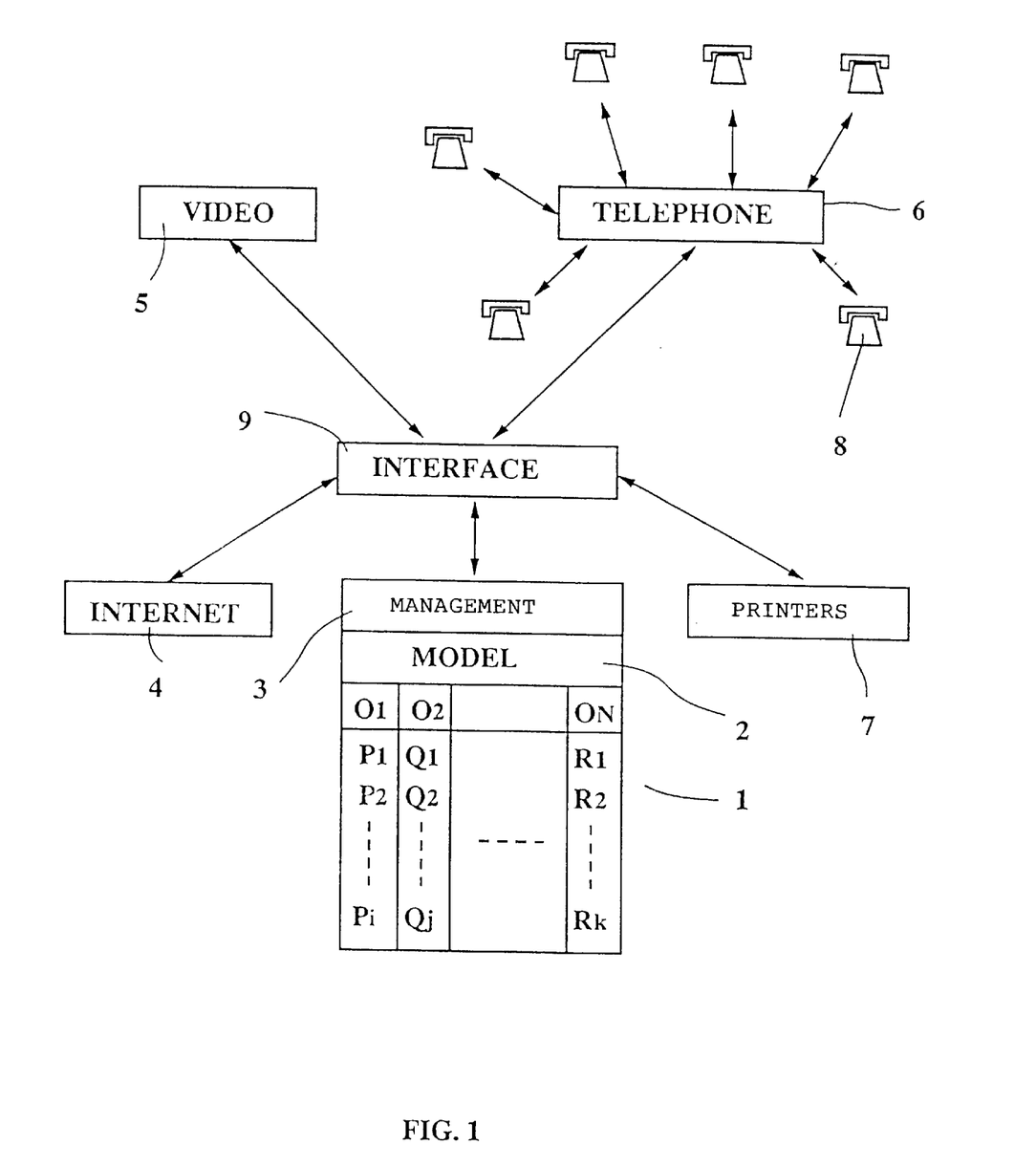
FIG. 1 is an overall diagram of a data switching system according to the invention.

FIG. 1 shows the general architectural of a system according to the invention.

This system comprises in the first place memory and management means forming a nucleus 1. The nucleus 1 is composed of a memory module 2 and a management module 3.

The memory module 2 is essentially made up of a memory for storing a model constituted of objects Oi provided with properties Pj. For processing purposes, the objects oi may be regarded as vectors having coordinates Pj.

The management module 3 consists of calculating means arranged to ensure coherence of the stored model during its evolution over time. Module 3 also has the function of informing the peripherals described below as to the state of the module.

The nucleus 1 is advantageously embodied as a microcomputer. It may nevertheless be more or less partially hard-wired. Conversely, it could be entirely integrated on a specialized semiconductor circuit.

The model stored in memory module 2 is representative of the network on which data are to be switched by the system according to the invention. More particularly, the various objects Oi are representative of the elements of this network, the properties Pj of these objects defining the characteristics of these elements at a given moment.

The above-described network may circulate any type of data. FIG. 1 shows such a network comprising an internet component 4, a video signal transmission component 5, a telephone component 6, and a component 7 made up of a printer network.

Each of these components is provided with a certain number of terminals. Shown here are only the terminals of the telephonic component, constituted by stations 8.

A module 9 provides an interface between the nucleus 1 and the components 4–8. Physically, this interface may be integrated with the nucleus 1.

The interface module 9 manages commands for modifying the model in response to events affecting the hardware elements of the network, in particular the terminals such as shown at 8. For telephone stations, these events are for example disconnection, dialing of a number, a standby state of a line, dialing a prefix for transferring to another station of the network (or out of the network, as one of the consequences of the invention applied to telephony is the nondistinction between in-network and out-of-network stations).

The system can be managed by only three operating commands, apart from possible simple display commands such as a command for listing objects. These are commands for creating an object, modifying an object, or more particularly at least one of its properties, and eliminating an object. These commands constitute means for manipulating the objects of the model.

Interface 9 also transmits in the opposite direction commands to the terminals, for example a ringing command.

It will be noted that FIG. 1 does not distinguish, within the interface, the electronic interface functions themselves, and the functions for generating commands for creating, modifying or deleting an object. Another possibility would be to integrate the command generation function within nucleus 1, and preserve module 9 only for the strict interface function.

The model stored in the memory module 2 comprises two types of objects belonging either to a logical addressing class or a physical addressing class.

The logical addressing objects describe a logical addressing graph representative of the network, but have no direct relation with the hardware elements of this latter. It is especially this characteristic which confers flexibility to the system according to the invention.

On the other hand, the physical addressing objects are directly representative of these hardware elements. The correspondence between logical addressing objects and physical addressing objects is effected by properties of certain objects, and in particular by address-type objects which will be described below and which each have among their properties a logical address and a physical address.

Objects of the Model

There will now be described in detail the principal objects of the model, with their principal properties and the CREATE and MODIFY commands which are accessible for each of these properties. The DELETE command is accessible only for an entire object.

Logical Addressing Objects

These objects are of four types: addresses, links, connections and calls.

An address is a node of the logical addressing graph. Table 1 below shows its principal properties and gives the characteristics thereof.

An address has in the first place a regular identification expression (id) which permits it to be designated symbolically by one or several names.

Its logical address (address) and physical address (addressphysical) allow correlating the logical and physical levels of the model.

Its capacity is the number of connections which can pass through the address. Typically, in telephony, exceeding a capacity of one address corresponds to a busy signal. Otherwise, a call ringing or standby message is generated.

The algorithm for call selection (routing) permits choosing, from a plurality of calls arriving at the address, those which will be selected.

Moreover, the distribution algorithm determines, when a call arrives at an address having a plurality of subsidiary addresses, those to which the call will be directed. This is for example the case when the address to which the call arrives is that of a pool of operators. The call is thus for example directed to that operator which has been connected for the shortest time. On the other hand, a language criterion may be used for choosing the operator.

It will be observed that the set of properties, with the exception of the identifier, may be established upon creating an object and subsequently modified (see the entry "x" in the Resources Create and Resources Modify columns).

TABLE I

ADDRESSING

| Property | Characteristic | Resources | |
|---|---|---|---|
| | | Create | Modify |
| id | Identifier | | |
| address | Logical address | x | x |
| capacity | Capacity | x | x |
| routing | Call selection algorithm | x | x |
| offerMultiple | Distribution algorithm | x | x |
| addressPhysical | Physical address | x | x |

A link (Table II) is a directed transtion of the software addressing graph. It therefore associates two logical addresses of the graph, namely a source address and a target address.

It possesses an identifier.

Its capacity defines the number of connections which may pass through the link.

TABLE II

LINK

| Property | Characteristic | Resources | |
|---|---|---|---|
| | | Create | Modify |
| id | Identifier | | |
| source | Source address | x | x |
| target | Target address | x | x |
| capacity | Capacity | x | x |

A connection (Table III) is a set of connected links of the logical addressing graph (a routing path). It is associated with a call.

As with all of the objects, a connection possesses an identifier.

Two properties define the call with which the connection is associated and the channel through which it passes. One other property indicates the peripheral which manages this channel.

The direction property allows data transfer to be limited to only one direction. This corresponds to call privacy in telephony.

The current address is that to which the connection is made at a given moment. It may differ from the initial address, for example in case of forwarding or distribution in a call center.

The selection flag is a boolean property by which a connection is selected. By convention, at most only one connection may be selected from those which are associated with the same channel. In telephony, the "deselection" corresponds to the camp-on of a communication.

TABLE III

CONNECTION

| Property | Characteristic | Resources | |
|---|---|---|---|
| | | Create | Modify |
| id | Identifier | | |
| callid | Associated call | x | |

TABLE III-continued

CONNECTION

| Property | Characteristic | Resources | |
|---|---|---|---|
| | | Create | Modify |
| direction | Data direction | x | x |
| address | Current address | x | |
| selection | Selection flag | | x |
| state | Current state | | |
| channelid | Channel in use | x | |
| peripheralid | Peripheral managing the channel in use | | |

At a given moment, a connection may exist in one of the following states:

STANDBY (awaiting logical routing);

IN PROGRESS (physical routing underway);

ALERT (awaiting connection, physical and logical routing being terminated);

CONNECT (connection established);

FAILURE (the connection is about to be lost).

The STANDBY state indicates that routing of the connection is not completed and its current address is not definite. This situation corresponds in particular to the case of a connection registered in a line, awaiting distribution at an operator station.

The IN PROGRESS state indicates that the logical routing of the connection is achieved and that its physical addressing is in progress (progress through a telecommunication network).

The ALERT state indicates that the logical and physical routings of the connection are completed, and that the connection is awaiting establishment (typically, this is when the target station rings).

The CONNECT state indicates that the connection is established and operational.

The FAILURE state indicates that the connection is at the point of being lost.

A call (Table IV) is an object which permits association of several connections relative to one another.

One of its properties is constituted by the list of connections associated therewith. A call is often associated with two connections. This is the case for normal telephonic communication established between two end points. In the case of a conference communication, a call is associated with as many connections as there are participants in the conference.

A call also has a data field that can be transmitted during a communication and if desired transferred to another application. The data may concern the context in which the communication develops.

TABLE IV

CALL

| Property | Characteristic | Resources | |
|---|---|---|---|
| | | Create | Modify |
| id | Identifier | | |
| dataprivate | Application data | x | x |
| connectionid | List of connections pertaining to the call | | |

Physical Addressing Objects

These objects are also of four types: peripherals, channels, multiplexes and outgoing routes.

A peripheral (Table V) is an object capable of managing a certain number of channels. Typically, a peripheral is constituted by a telephone line.

Its principal properties are its identifier, a symbolic name, and its capacity. This latter defines the maximum number of channels which may be carried on this peripheral.

TABLE V

PERIPHERAL

| Property | Characteristic | Resources | |
|---|---|---|---|
| | | Create | Modify |
| id | Identifier | | |
| name | Symbolic name | x | x |
| capacity | Maximum number of channels | x | x |

A channel (Table VI) is an object which describes a physical communication, and which is associated with a peripheral.

TABLE VI

CHANNEL

| Property | Characteristic | Resources | |
|---|---|---|---|
| | | Create | Modify |
| id | Identifier | | |
| namePeriph | Managing peripheral | x | |
| addressLocal | Local address | x | x |
| addressRemote | Remote address | x | x |
| state | Current state | | |
| connectionid | List of connections in use | | |

It may also be associated with zero, one or several connections through the intermediary of a multiplex-type object.

A channel possesses an identifier.

Among its properties are the name of the peripheral which manages it, as well as its two extreme addresses, local and remote. In the field of telephony, this latter is the dialled number.

The state property defines the current state of the line at a given moment.

Lastly, the connection property comprises the list of all connections which traverse the channel.

A multiplex is an object which defines the capacity of a channel so as to be associated with zero, one or several connections.

A multiplex moreover comprises an identifier and an expression of address selection. This latter is, in the field of telephony, the telephone number associated with the channel of the multiplex.

TABLE VII

MULTIPLEX

| Property | Characteristic | Resources | |
|---|---|---|---|
| | | Create | Modify |
| id | Identifier | | |
| address | Selection expression | x | x |
| capacity | Maximim number of connections | x | x |

An outgoing route associates a class of physical addresses with an ordered set of peripherals. Typically, an outgoing route allows determining that a certain class of telephone numbers, for example international numbers, should to the extent possible be conducted on certain telephone lines, for example on those connected to a particular network operator whose long distance rates are advantageous.

The outgoing route comprises an identifier.

The address property defines the class of addresses in question.

The list of peripherals defines in an ordered manner the peripherals to be used for this class of addresses.

TABLE VIII

OUTGOING ROUTE

| Property | Characteristic | Resources | |
|---|---|---|---|
| | | Create | Modify |
| id | Identifier | | |
| address | Address | x | x |
| listPeriph | List of peripherals | x | x |

Organization of the Logical Addressing Objects

Figure 2:
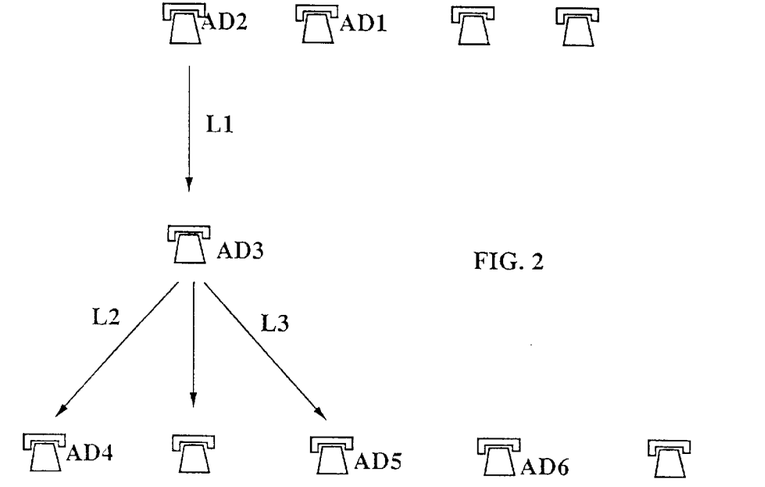
FIG. 2 shows an example of the logical addressing means of the system according to the invention.

FIG. 2 shows a diagram of the logical addressing graph of a system according to the invention applied to the management of a telephonic installation. This diagram corresponds to the case where the overall system is at rest. Examples of the operation of this system will be shown as follows with reference to FIGS. 4a to 4f.

The address-type objects are here represented symbolically by telephone stations associated with their logical addresses. Only the logical addresses AD1 to AD6 are shown.

For example, it is appropriate that the logical address AD1 corresponds to exterior lines. Thus, the source of an incoming call will be allotted to this logic address. Moreover, when a number will be dialed locally commencing with the prefix 0, such that it will be appropriate for this number to be dialed so as to use the exterior line, a connection will be created in the direction of this logical address.

It is also suitable that the logic address AD2 corresponds to a telephonic standard.

Finally, it can be seen from this figure that the links between addresses have been created independently of any call. These links are shown by arrows connecting certain of these addresses. More particularly, a link L1 connects the address AD2 corresponding to the standard to the address AD3, which is itself connected by links L2, . . . L3 to a plurality of addresses AD4, . . . AD5. It will be seen hereafter that these links establish a hierarchy in this case corresponding to a grouping of stations.

Organization of the Physical Addressing Objects

Figure 3:
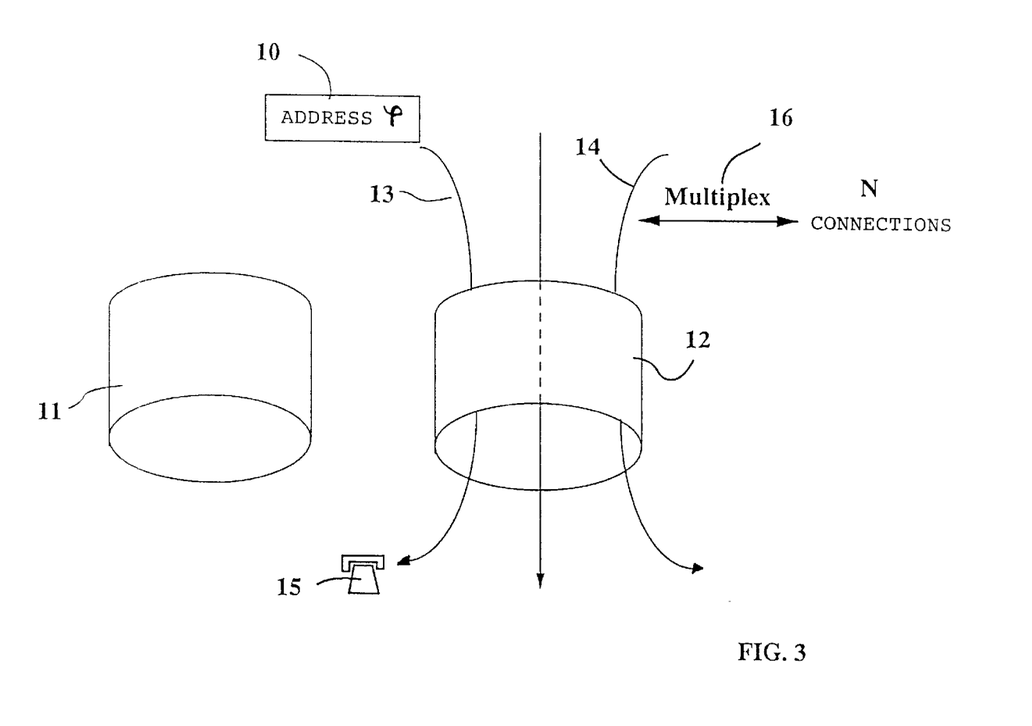
FIG. 3 illustrates the principle of the physical addressing means of this system.

This organization is illustrated in FIG. 3.

To a given physical address 10, typically a telephone number, there is associated by an outgoing route-type object a certain number of possible peripherals 11, . . . 12, which are telephone lines in the present case. In other words, various peripherals are defined according to the type of physical address.

By way of example, an outgoing route could be provided containing 16 peripherals for establishing local calls, another containing 4 peripherals for nationwide calls, and a final one containing 2 peripherals for international calls.

Each of these peripherals is able to manage a certain number of channels, namely 13, . . . 14 in the case of the peripheral 12. One of these channels, in this case channel 13, is used to connect the physical address, typically the local station, to the remote station 15.

Moreover, a multiplex type object 16 allows specifying, for a given physical address, the number of connections which can be established on the same channel, typically on a same telephonic communication.

For example, an interior station, which may generally have simultaneous connections, will be typically associated with a multiplex of capacity 2. In the case of an exterior station, the capacity of the multiplex will be, as for an interior station, generally set at 2, so as to permit management of two communications at this station.

Conversely, any exterior number will be typically associated with a multiplex of capacity 1. A channel will in this case be established for each call intended for that number.

Finally, an operator station will generally be associated with a multiplex of capacity greater than 2, for example 8, corresponding to the maximum number of communications simultaneously managed at this station.

Management of the Logical Addressing Objects.

FIGS. 4a to 4f show the progression of a communication at the level of the logical addressing objects.

Figure 4A:
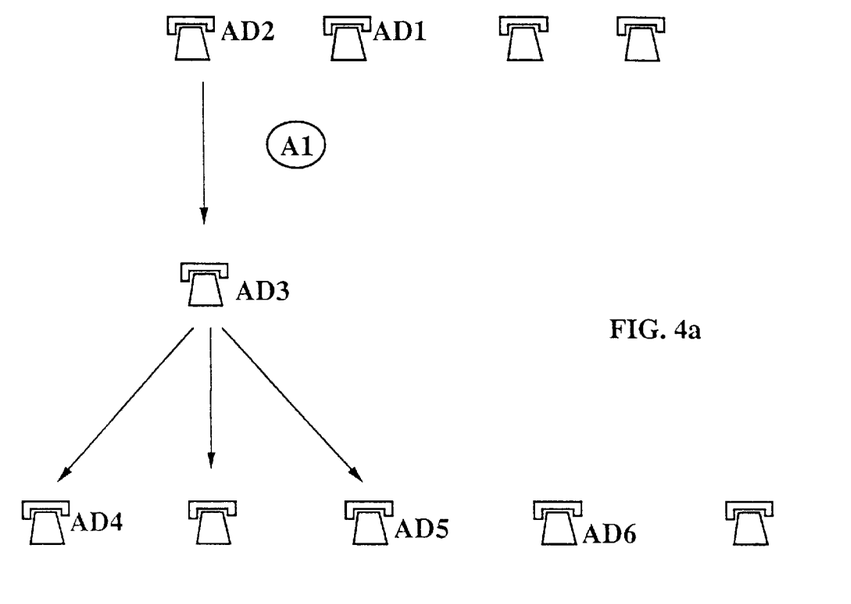
FIGS. 4a to 4f illustrate at the logical level various steps of telephonic communication managed by a system according to the invention.
Figure 4B:
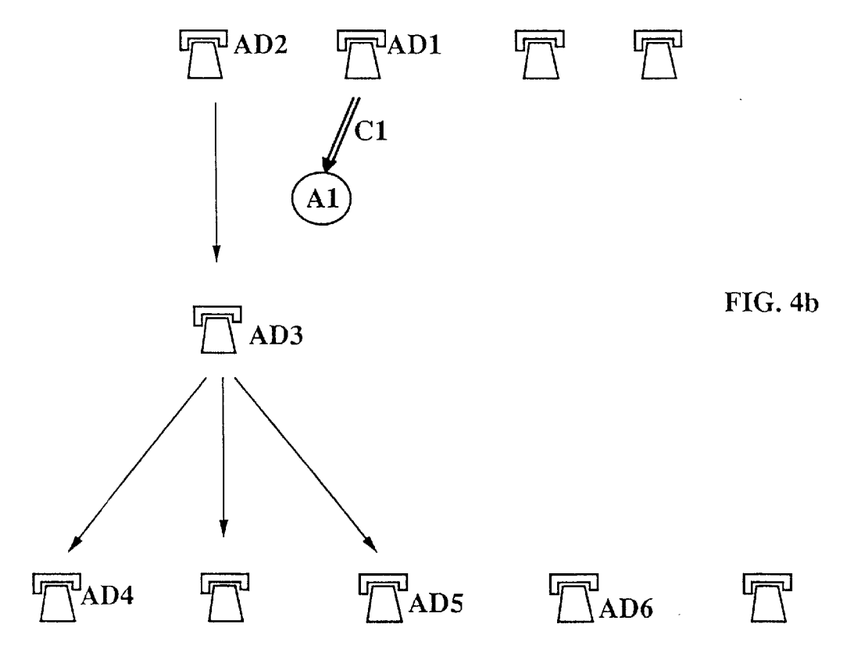

Assuming that an incoming call arrives in the manner of FIG. 2, the first action taken is the creation of a call (FIG. 4a). There is thus sent to the nucleus 1 a command of the type It is assumed above that the only property provided for the command would be the identifier of the created call, the others being set by default. However, it should be understood that it could also be otherwise. In particular, the identifiers will generally be assigned automatically.

Figure 4C:
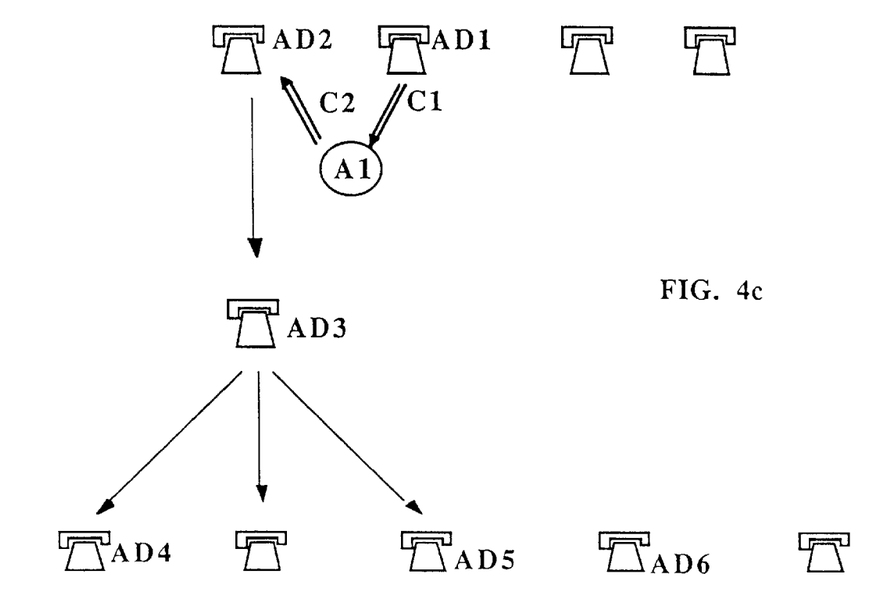

Thereafter, two connections will be created pertaining to the call A1, one associating with this call the logical address AD1 corresponding to exterior calls (FIG. 4b), the other associating with this call the logical address AD2 corresponding to the standard (FIG. 4c). That is, for example create (connection, C1, A1, AD1, A1) and create (connection, C2, A1, A1, AD2)

Assume now that the number called is that of the group of lines corresponding to the logical addresses AD4, . . . AD5, managed from the logical address AD3. If it is desired to conduct the call finally to the station (physical address) corresponding to the logical address AD4 (FIG. 4d) the following command could be addressed to the nucleus 1 modify (connection, C2, AD2, AD3) which will in turn generate modify (connection, C2, AD3, AD4)

Figure 4D:
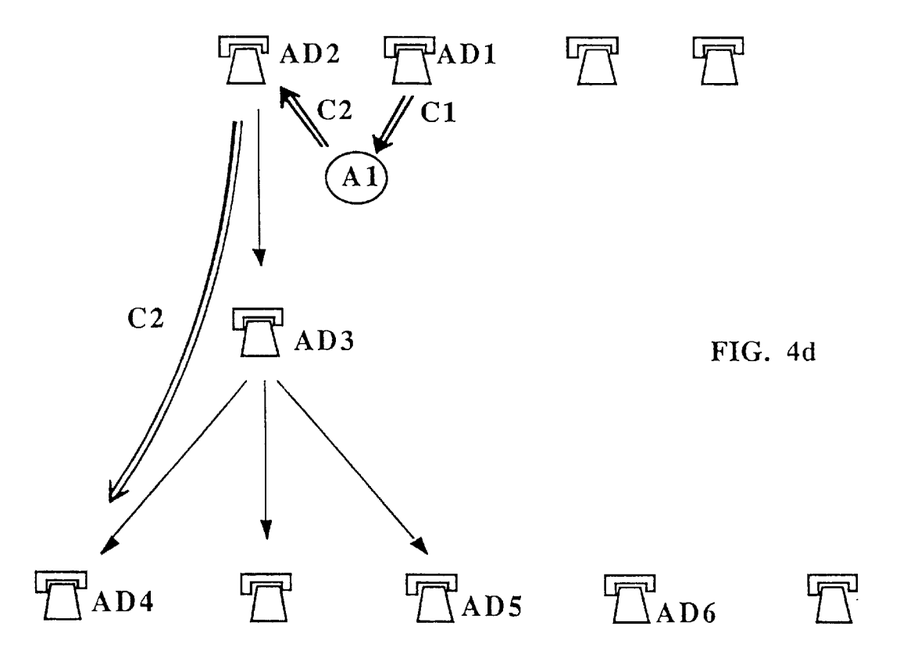

It will be noted that there are generally several ways to achieve the desired result. Thus, it is possible to replace the modify commands by pairs of delete, create commands.

Figure 4E:
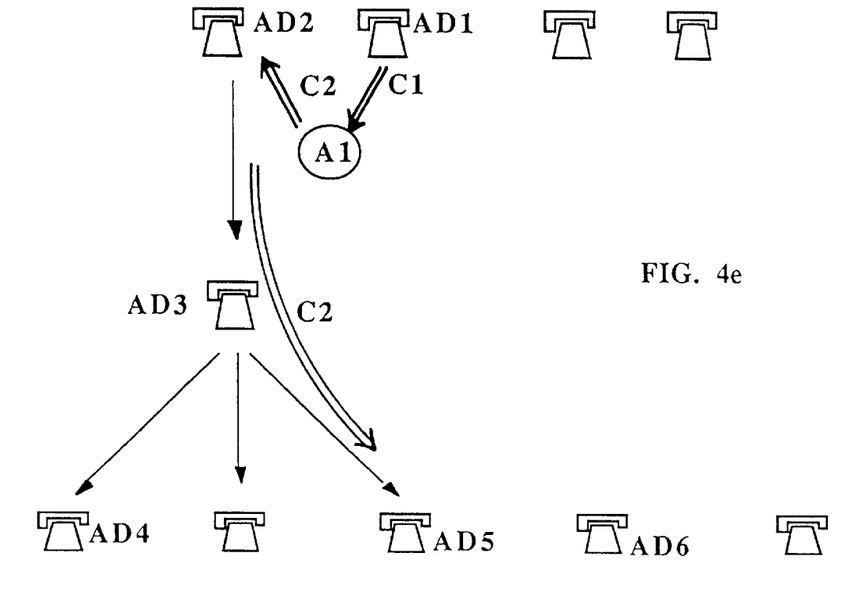

Suppose now that the station corresponding to the logic address AD4 is programmed for call forwarding (be it in the case of no answer, or if it is in use, or immediately) toward the station corresponding to the logical address ADS (FIG. 4e). A command of the following type is thus generated modify (connection, C2, AD4, AD5)

Figure 4F:
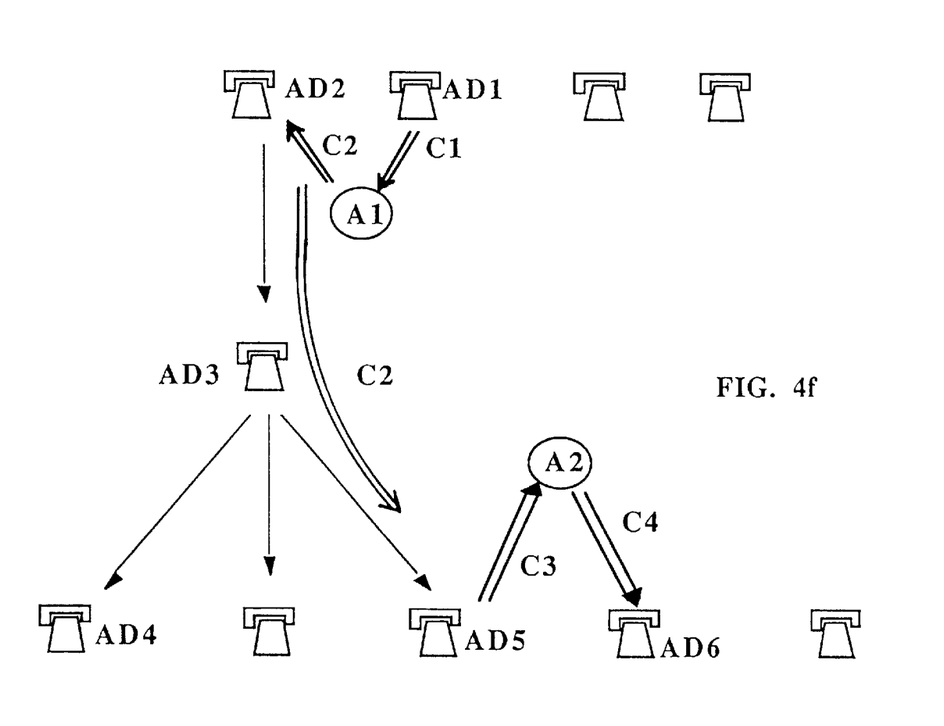

FIG. 4f illustrates the case where the operator of the station corresponding to the logic address ADS desires to enter into communication with that of the station corresponding to the logic address AD6. An exterior communication thereby enters the standby state via a command of the type modify (connection, C2, selection) since there has been created as above a new call A2 and two new connections C3 and C4 associated with this call.

It will be noted that a three-way conference between the outside caller and the operators of the stations corresponding to the logic addresses ADS and AD6 would be possible by refraining from deselecting the connection C2 and by directly creating a new connection between Al and AD6.

Communication between AD5 and AD6 is effected by the commands delete (connection, C3)

delete (connection, C4) and delete (call, A2)

Finally, it would have been possible not to delete the call A2, if application data were to be exported for subsequent use. This is a case of a connectionless call.

Management of Calls Outgoing Calls

Figure 5:
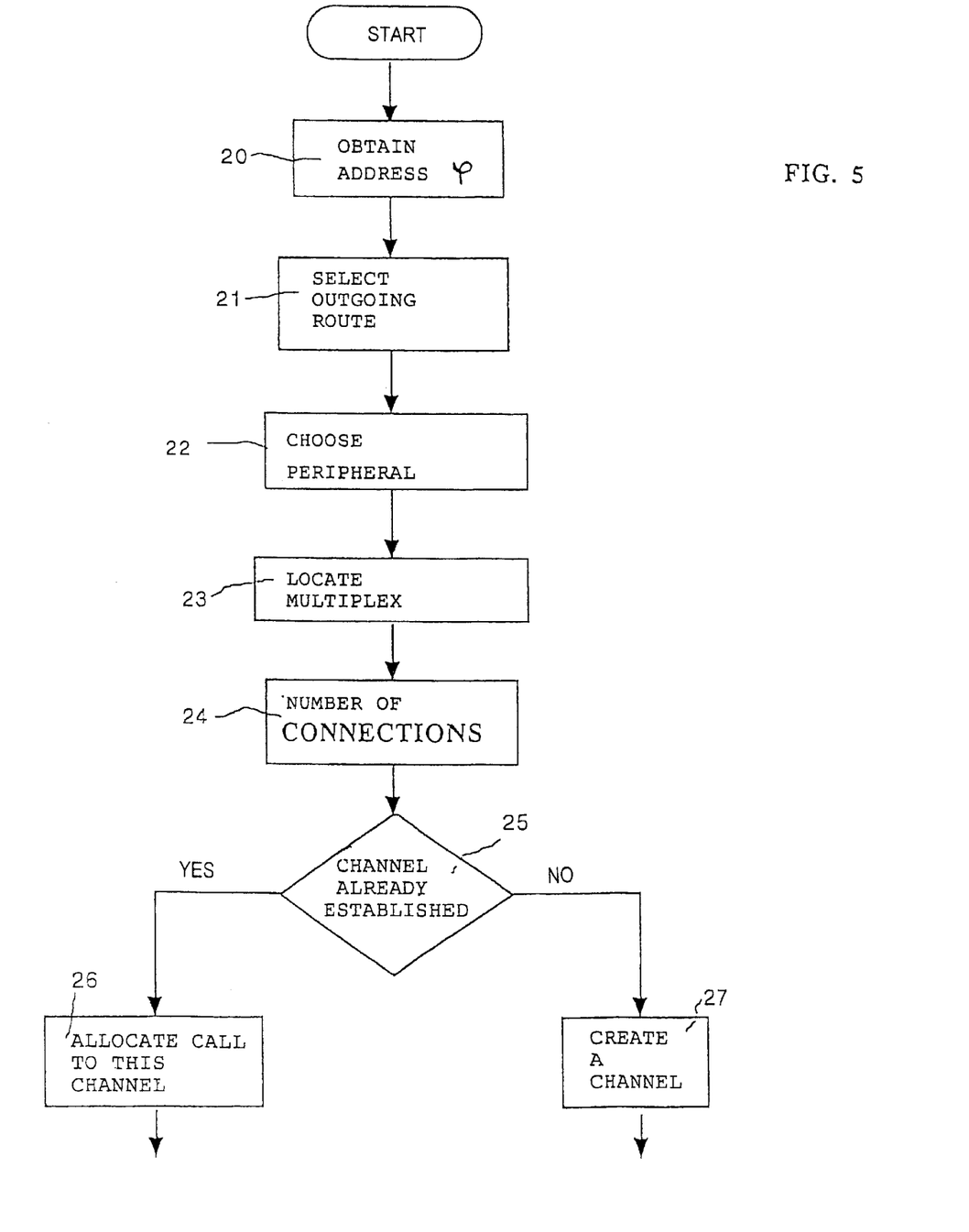
FIG. 5 is a flow chart showing the management algorithm for an outgoing call.

The flow chart of FIG. 5 shows the management of an outgoing call.

When communication is to be established with a given physical address, the following steps are performed:

locate an outgoing route;

locate a peripheral;

locate a multiplex.

The processes begin by obtaining at 20 the physical address associated with the current logical address for the connection associated with the call.

An outgoing route is then selected at 21 as a function of the class of physical address obtained, which permits obtaining a set of peripherals (property listperiph) authorized to emit the call.

One of these peripherals is then selected at 22, generally the first available in the list.

The following step consists of locating a multiplex, at 23. This search is effected from the address property of the multiplex objects, which corresponds to the physical address of the called number.

The located multiplex permits specifying, at 23, for each address, how many connections may be established on the same channel.

Once an outgoing route and a multiplex are located for the requested number, it is possible to:

either perform at 26 the call on an already-established channel, located at 25, or create a new channel at 27.

The first case occurs if the located multiplex has a capacity greater than 0, if a channel is already created (established or in the process of being established) toward the requested number for one of the peripherals of the outgoing route, and if the channel does not already have the maximum number of connections permitted by the multiplex.

A channel is created in any other case.

It should be noted that the selected peripheral must be available and must not be saturated (maximum number of channels which it is capable of managing).

Incoming Calls

All incoming calls are treated in the same manner whether they are in-network calls (disconnection from a local station) or out-of-network calls received from the public network.

The incoming calls are managed in the same manner as the outgoing calls, with the exception of the selection of an outgoing route (the peripheral is already known).

Whatever processing is applied thereto, a call always causes creation of a new channel.

What is claimed:

1. System for switching data between terminals of a communications network, comprising:
   memory and management means for storing a dynamic model of the network and providing management of this model, the model being constituted by a set of objects (Oi) which are representative of a present-time state elements of the network at a given moment and which posses properties (Pj) defining present-state characteristics of these elements at that moment,
   means for manipulating the objects and adapted to create new objects, modify existing objects, or delete existing objects in the model to reflect temporal re-configuration of the network, and
   an interface between the memory and management means and hardware elements of the network.

2. Data switching system according to claim 1, in which the model comprises:
   a first dynamic class of logical addressing objects comprising address-type objects defining the present-time state of network elements, these logic addressing objects changing as the present-time state of network elements change, and
   a second status class of physical addressing objects,
   wherein the first and second classes are associated at a level of the address-type objects which each possess among their properties a logic address and a physical address.

3. Data switching system according to claim 2, in which the first class of logical addressing objects comprises addresses (ADi) forming nodes of a logical addressing graph defining present-time network connectivity, links (Li) forming directed transitions between a source logic address and a target address of the logic addressing graph, connections (Ci) constituted by a linear set of connected links representing a present-time active communication route, and present-time active calls (Ai) constituted by the association of several connections.

4. Data switching system according to claim 2 in which an address has as a property, among its logic and physical addresses a capacity defining the number of connections which may be associated therewith.

5. Data switching system according to claim 3 in which a link has as a property, apart from references to its source address and target address, a capacity defining a number of connections which may pass therethrough.

6. Data switching system according to claim 3 in which a connection has as a property a state, characteristic of the progress of its development.

7. Data switching system according to claim 3 in which a connection has as a property a reference to a call with which it is associated.

8. Data switching system according to claim 3 in which a connection may be undergoing logical routing, undergoing physical routing, awaiting establishment, the physical and logical routings being terminated, established, or in the process of being eliminated, the state property defining this characteristic.

9. Data switching system according to claim 3 in which a call has as a property a list of the connections associated therewith.

10. Data switching system according to claim 2 in which the second class of physical addressing objects comprises peripherals (11, 12), objects capable of managing a certain number of channels, these channels (13), adapted to describe a physical communication and each associated with a peripheral, and multiplexes (16), defining a capacity of a channel to be associated with zero, one or several connections.

11. Data switching system according to claim 2 in which the second class of physical addressing objects additionally comprises outgoing routes, arranged to associate a set of physical addresses with an ordered set of peripherals.

12. Data switching system according to claim 10 in which a peripheral has as a property a capacity defining the maximum number of channels which it is capable of managing.

13. Data switching system according to claim 10 in which a channel has as properties a local address and a remote address defining two extreme addresses for physical communication carried thereby.

14. Data switching system according to claim 10 in which a channel also comprises a list of connections passing therethrough.

15. Process for managing an outgoing call using a data switching system, when a communication is to be established with a given physical address, in a network having
   a memory and management means for storing a model of the network and providing management of this model, the model including a set of objects (Oi) which are representative of the network elements at a given moment and which posses properties (Pj) defining the characteristics of these elements at that moment;
   a means for manipulating the objects and adapted to create new objects, modify existing objects, or delete existing objects in the said model; and
   an interface between the memory and management means and hardware elements of the network,
   the model including a class of logical addressing objects comprising address-type objects and a class of physical addressing objects,
   the two classes being associated at the level of the address-type objects which each class possesses among their properties a logic address and a physical address,
   the class of physical addressing objects comprising peripherals, objects capable of managing a certain number of channels, these channels, adapted to describe a physical communication and each associated with a peripheral, and multiplexes, defining a capacity of a channel to be associated with zero, one or several connections,
   comprising the steps consisting of:
      selecting (21) an outgoing route as a function of said given physical address;
      choosing (22) a peripheral from the set defined by the selected outgoing route;
      locating (23) a multiplex associated with said given physical address;
      specifying (24) from this multiplex how many connections may be established on the same channel; and
      making (26) a call on an established channel if the located multiplex has a capacity greater than 0, and if a channel is already created toward said given physical address, for one of the peripherals of the selected outgoing route; or
      creating (27) a new channel in the contrary case.

* * * * *